US011615627B2

(12) United States Patent
Yamashina et al.

(10) Patent No.: US 11,615,627 B2
(45) Date of Patent: Mar. 28, 2023

(54) OBJECT RECOGNITION APPARATUS, VEHICLE CONTROL APPARATUS, OBJECT RECOGNITION METHOD, AND VEHICLE CONTROL METHOD

(71) Applicants: Mitsubishi Electric Corporation, Tokyo (JP); MAZDA MOTOR CORPORATION, Hiroshima (JP)

(72) Inventors: Noriyoshi Yamashina, Tokyo (JP); Masanori Mori, Tokyo (JP); Koji Iida, Tokyo (JP); Tomohiro Akiyama, Tokyo (JP); Shinichi Tateiwa, Tokyo (JP); Takayuki Moritani, Hiroshima (JP); Hiroyuki Ueda, Hiroshima (JP); Hideaki Tamazumi, Hiroshima (JP); Junki Tamaru, Hiroshima (JP); Yoshihiro Yamamoto, Hiroshima (JP)

(73) Assignees: Mitsubishi Electric Corporation, Tokyo (JP); MAZDA MOTOR CORPORATION, Hiroshima (JP)

( * ) Notice: Subject to any disclaimer, the term of this patent is extended or adjusted under 35 U.S.C. 154(b) by 531 days.

(21) Appl. No.: 16/597,958

(22) Filed: Oct. 10, 2019

(65) Prior Publication Data

US 2020/0117913 A1 Apr. 16, 2020

(30) Foreign Application Priority Data

Oct. 16, 2018 (JP) .............................. JP2018-194766

(51) Int. Cl.
*G06V 20/56* (2022.01)
*B60W 30/09* (2012.01)
(Continued)

(52) U.S. Cl.
CPC ............. *G06V 20/56* (2022.01); *B60W 10/04* (2013.01); *B60W 10/20* (2013.01); *B60W 30/09* (2013.01);
(Continued)

(58) Field of Classification Search
None
See application file for complete search history.

(56) References Cited

U.S. PATENT DOCUMENTS

| 2014/0032012 A1 | 1/2014 | Joshi et al. | |
| 2016/0003936 A1* | 1/2016 | Hibino | G01S 13/04 342/27 |

(Continued)

FOREIGN PATENT DOCUMENTS

| JP | 2010-96589 A | 4/2010 |
| JP | 6224370 B2 | 11/2017 |
| JP | 2017-227580 A | 12/2017 |

OTHER PUBLICATIONS

JP office action dated Oct. 1, 2019 in Patent Application No. 2018-194766.

*Primary Examiner* — Navid Z. Mehdizadeh
(74) *Attorney, Agent, or Firm* — Sughrue Mion, PLLC; Richard C. Turner (57) ABSTRACT

There are provided an object recognition apparatus that raises the recognition accuracy for a surrounding object and a vehicle control apparatus, and an object recognition method and a vehicle control method. An object recognition apparatus receives object data, which is a state value of the object, from a first sensor for detecting a surrounding object; compares estimation data obtained through estimation of a state value of the object, based on recognition data calculated in a past period, with the object data, and determines whether or not the object data is data in a low-resolution state; then, in accordance with the determination result, (Continued)

calculates the state value of the object by use of object data and estimation data and then generates the state value as recognition data, so that the recognition accuracy for an object is raised.

8 Claims, 8 Drawing Sheets

(51) Int. Cl.
| | | |
|---|---|---|
| *B60W 10/20* | (2006.01) | |
| *B60W 10/04* | (2006.01) | |
| *G01S 7/41* | (2006.01) | |
| *G01S 13/86* | (2006.01) | |
| *G01S 13/931* | (2020.01) | |

(52) U.S. Cl.
CPC ..... *B60W 2420/42* (2013.01); *B60W 2420/52* (2013.01); *B60W 2554/00* (2020.02); *B60W 2710/20* (2013.01); *B60W 2720/106* (2013.01); *G01S 7/41* (2013.01); *G01S 13/867* (2013.01); *G01S 13/931* (2013.01); *G01S 2013/9318* (2020.01); *G01S 2013/9319* (2020.01)

(56) References Cited

U.S. PATENT DOCUMENTS

| | | | |
|---|---|---|---|
| 2017/0372149 A1 | 12/2017 | Mori | |
| 2019/0276030 A1* | 9/2019 | Maeda | G01S 15/86 |
| 2021/0124037 A1* | 4/2021 | Roh | G01S 17/87 |
| 2021/0224617 A1* | 7/2021 | Igarashi | G01S 13/931 |
| 2021/0264224 A1* | 8/2021 | Tamaoki | G01S 7/411 |
| 2021/0302534 A1* | 9/2021 | Kellner | G01B 15/00 |

\* cited by examiner

OBJECT RECOGNITION APPARATUS, VEHICLE CONTROL APPARATUS, OBJECT RECOGNITION METHOD, AND VEHICLE CONTROL METHOD

INCORPORATION BY REFERENCE

The disclosure of Japanese Patent Application No. 2018-194766 filed on Oct. 16, 2018 including its specification, claims and drawings, is incorporated herein by reference in its entirety.

BACKGROUND

The present disclosure relates to an object recognition apparatus for recognizing a surrounding object and a vehicle control apparatus utilizing the same and relates to an object recognition method and a vehicle control method utilizing the same.

In a conventional object recognition apparatus (e.g., refer to JP 6224370 B, (Pages 5 through 9, FIG. 1)), the respective outputs of a first sensor and a second sensor mounted in an own vehicle are received; then, based on the received respective outputs of the first sensor and the second sensor, a first observation value and a second observation value are detected after being synchronized with each other. Subsequently, the detected first observation value and the detected second observation value are projected onto a graph network; then, the first observation value and the second observation value are related to a target object that has a trajectory on the graph network. Then, any one of the first observation value and the second observation value is selected based on the sensor characteristics, so that the present position of the target object is estimated.

SUMMARY

There will be explained problems in a conventional object recognition apparatus in which the first sensor is, for example, a radio-wave radar. For example, in the case where in front of an own vehicle, there exist other vehicles traveling side by side and the angle between the straight line connecting the own vehicle and one of the other vehicles and the straight line connecting the own vehicle and the other one of the other vehicles is small, the vehicles traveling side by side cannot be separated from each other when the foregoing angle is smaller than the specified angular resolution of the radio-wave radar. In other words, in the surrounding of the own vehicle, even when traveling side by side, the other vehicles can be separated from each other because the foregoing angle is large; however, when the other vehicles are far away from the own vehicle, they cannot be separated from each other because the foregoing angle is small. In the case where because the other vehicles traveling side by side are far away from the own vehicle, they cannot be separated from each other, the radio-wave radar outputs a detection result while regarding the two or more vehicles as a single object data.

As described above, due to the positional relationship between the own vehicle and the other vehicles traveling side by side, there exists the case where the radio-wave radar can separate the other vehicles traveling side by side in the immediately previous period but cannot separate the other vehicles traveling side by side in the present period. In addition, in the case where the angular resolution is low and hence vehicles as two or more objects cannot be separated from one another, the angular accuracy is deteriorated. That is to say, the transverse resolution is deteriorated. In the case where by use of an output whose transverse position accuracy is so deteriorated that the radio-wave radar cannot separate two or more objects, the respective outputs based on the detection result of the radio-wave radar in the immediately previous period and the detection result of the radio-wave radar in the present period are related to each other on a one-to-one basis, there exists a problem that the recognition accuracy is reflected in the output result of the object recognition apparatus and hence the transverse recognition accuracy of the output from the object recognition apparatus is deteriorated.

Next, there will be explained problems in a conventional object recognition apparatus in which the first and second sensors are, for example, a radio-wave radar and a camera, respectively. As described above, in some cases, a radio-wave radar outputs a radar detection result while regarding two or more other vehicles, which are traveling side by side in a place far away from the own vehicle, as a single object data.

In contrast, the angular resolution (transverse resolution) of a camera is higher than that of the radio-wave radar; therefore, there seldom occurs the case where two or more other vehicles traveling side by side in a place far away from the own vehicle cannot be separated from each other. A camera seldom outputs, as a single object data, two or more other vehicles that are traveling side by side in a place far away from the own vehicle; the camera outputs camera detection results corresponding to two or more objects. As described above, it is said that the transverse recognition accuracy of a camera is generally high. However, it is said that the longitudinal recognition accuracy of a camera is generally lower than that of a radio-wave radar.

In an object recognition apparatus that performs sensor fusion for integrating two or more sensor information items, in the case where the respective outputs of these two sensors (a radio-wave radar and a camera) are related to each other on a one-to-one basis, the transverse recognition accuracy of the radio-wave radar having a low resolution is reflected in the output result of the object recognition apparatus and hence the transverse recognition accuracy of the output from the object recognition apparatus is deteriorated. In addition, in the case where the respective outputs of the two detection results of the camera cannot be related to the respective outputs of the detection results of the radio-wave radar, the longitudinal recognition accuracy of the object recognition apparatus cannot be raised. That is to say, the longitudinal recognition accuracy is deteriorated.

As described above, there has been a problem that in a conventional object recognition apparatus, the longitudinal recognition accuracy cannot be raised. Moreover, there has also been a problem that because the transverse recognition accuracy is deteriorated, the recognition accuracy for objects in the surrounding of the own vehicle is deteriorated.

The present disclosure is to disclose a technology for solving the foregoing problems; the objective thereof is to provide an object recognition apparatus that raises the recognition accuracy for a surrounding object and a vehicle control apparatus utilizing the same and is to provide an object recognition method and a vehicle control method utilizing the same.

An object recognition apparatus disclosed in the present disclosure including:

a data reception unit that receives, from a sensor for detecting an surrounding object, object data that is a state value of the object;

an estimation processing unit that estimates a change in the state value of the object, based on recognition data calculated in the past, and then generates estimation result as estimation data. a low-resolution-state determination unit that compares the estimation data estimated by the estimation processing unit with the object data so as to determine whether or not the object data is data in a low-resolution state where the two or more objects cannot be separated from one another; and a recognition processing unit that generates recognition data by use of the estimation data and the object data, wherein in the case where the low-resolution-state determination unit determines that the object data is in the low-resolution state, the recognition processing unit reduces a reflection degree, to the recognition data, of this object data that was determined to be in the low-resolution state and then generates the recognition data.

An object recognition apparatus disclosed in the present disclosure makes it possible to raise the recognition accuracy for the surrounding object.

DETAILED DESCRIPTION OF THE EMBODIMENTS

Embodiment 1

Figure 1:
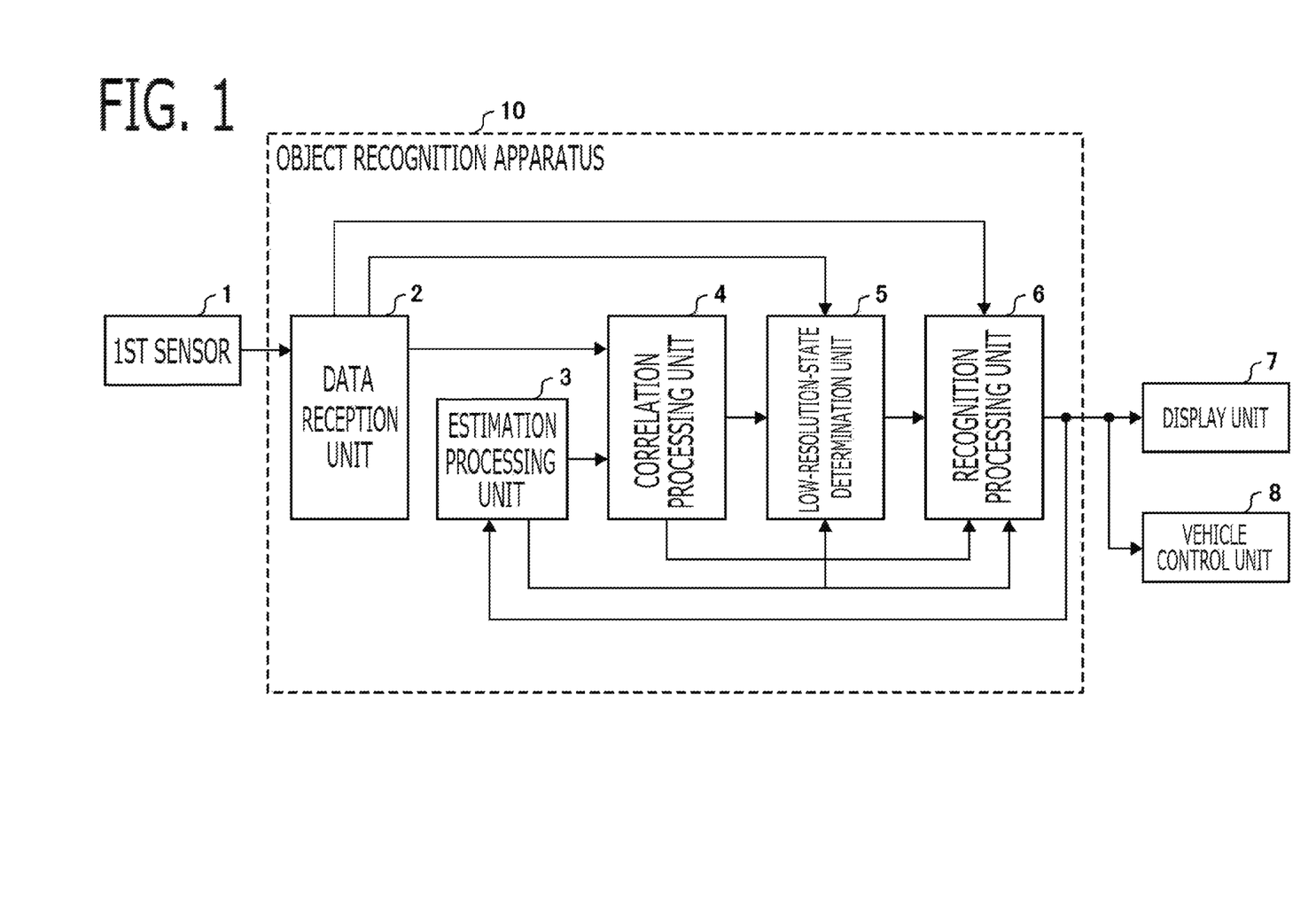
FIG. 1 is a block diagram representing the configuration of an object recognition apparatus according to Embodiment 1.

Embodiment 1 gives an example in which the number of sensor information items to be inputted to an object recognition apparatus is one. FIG. 1 is a block diagram representing the configuration of an object recognition apparatus according to Embodiment 1. In FIG. 1, an object recognition apparatus 10 includes a data reception unit 2, an estimation processing unit 3, a correlation processing unit 4, a low-resolution-state determination unit 5, and a recognition processing unit 6, which will be described later. A vehicle control apparatus has a display unit 7 or a vehicle control unit 8, described later, in addition to the object recognition apparatus 10.

A first sensor 1 detects an object existing in the surrounding of the own vehicle in a predetermined detection range and then outputs the detection result to the object recognition apparatus 10. The first sensor 1 is provided, for example, in the front portion, the side portion, or the rear portion of the body of the own vehicle. The first sensor 1 detects, as object data, one or more detection data items related to an object existing in the surrounding of the own vehicle in a predetermined detection range, i.e., the state value of the object. The first sensor 1 transmits the detected object data to the data reception unit 2 of the object recognition apparatus 10. The object data includes, for example, information items such as the longitudinal relative distance between the own vehicle and the object, the transverse relative distance between the own vehicle and the object, the relative speed of the object, and the relative acceleration of the object.

In general, in the case where a single object exists in a detection range where the first sensor 1 can perform detection, the object data includes a single detection data item; in the case where two or more objects exist in the detection range, the object data includes two or more detection data items. In Embodiment 1, the object data detected by the first sensor 1 will be referred to as a first object data, hereinafter.

The first sensor 1 irradiates light or an electromagnetic wave onto an object and then receives the light or the electromagnetic wave reflected by the object. Based on the received light or electromagnetic wave, the first sensor 1 detects, as the first object data, the object state value related to the object. The first sensor 1 receives, for example, light or an electromagnetic wave reflected by an object and then detects the first object data, which is the object state value related to the object, by applying signal processing and the like to the received signal. As the first sensor 1, for example, a millimeter wave radar is utilized.

The object recognition apparatus 10 estimates and generates the object state value, based on the first object data received from the first sensor 1. The object recognition apparatus 10 is realized, for example, through processing by a CPU (Central Processing Unit) or the like that runs a program stored in a memory.

The object recognition apparatus 10 is configured in such a manner as described below. The data reception unit 2 receives the first object data from the first sensor 1. The estimation processing unit 3 estimates an object state value from after-mentioned past recognition data and then generates the estimated state value, as estimation data. The estimation processing unit 3 outputs the generated estimation data to the correlation processing unit 4.

The correlation processing unit 4 receives the first object data outputted from the data reception unit 2 and the estimation data outputted by the estimation processing unit 3, determines correlation, i.e., determines whether or not each of the first object data and the estimation data is related to the same object, and then outputs the determined correlation, as correlation data. As the method of determining the correlation, Euclidean distances, Mahalanobis distances, or the like are utilized and, for example, in the case where the first object data and the estimation data are in a correlation that the distance therebetween is shorter than a threshold value and is shortest, the respective data items are defined as correlation data items that are in correlation. There may be utilized a method in which when in addition to the foregoing distance information, the respective types or the like of the first object data and the estimation data are the same, it is determined that a correlation exists. Based on a comparison between the first object data outputted from the data reception unit 2 and the estimation data outputted by the estimation processing unit 3, the low-resolution-state determination unit 5 determines whether or not the first object data is in a low-resolution state in which two or more objects cannot be separated from one another.

Based on the first object data, the estimation data outputted from the estimation processing unit 3, the correlation data outputted from the correlation processing unit 4 that determines the correlation, and the result of determination, by the low-resolution-state determination unit 5, on whether or not the first object data is in the low-resolution state, the recognition processing unit 6 generates an object state value, as recognition data. In addition, the recognition processing unit 6 outputs the recognition data to the estimation processing unit 3, the display unit 7, and the vehicle control unit 8.

As described above, by use of the past-period recognition data outputted from the recognition processing unit 6, the estimation processing unit 3 estimates present-period first object data (an object state value) and then outputs the estimated state value, as the estimation data.

When receiving the recognition data, the display unit 7 displays the position, the speed, and the like of the object on a screen (the step in which the recognition data is displayed on the display unit). When receiving the recognition data, the vehicle control unit 8 controls the travel of the own vehicle, based on the recognition data (the step in which the vehicle control unit controls the vehicle by use of the recognition data). The control of the travel of the own vehicle includes, for example, control items such as acceleration/deceleration and steering of the own vehicle. The apparatus including the object recognition apparatus 10 and the display unit 7 will be referred to as a first vehicle control apparatus. The apparatus including the object recognition apparatus 10 and the vehicle control unit 8 will be referred to as a second vehicle control apparatus.

The recognition processing unit 6 generates and outputs, as the recognition data, an object state value calculated by weighted-averaging the first object data (object state value) and the estimation data, using preliminarily determined weights. In the recognition processing unit 6, there may be utilized a method in which by use of a Kalman filter or the like, the object state value is updated.

Figure 3A:
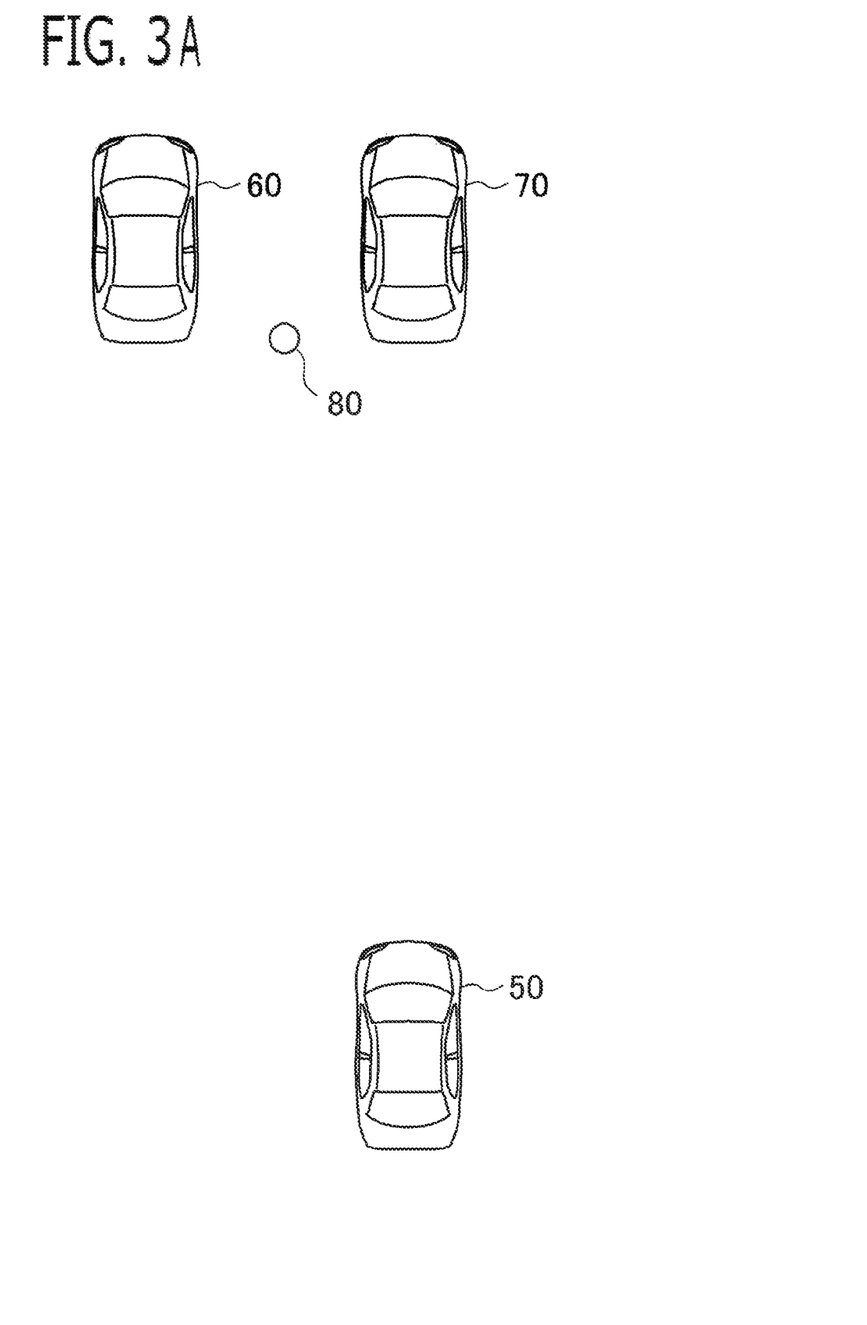
FIG. 3A and FIG. 3B are views for explaining an example of object detection by the object recognition apparatus according to Embodiment 1.
Figure 3B:
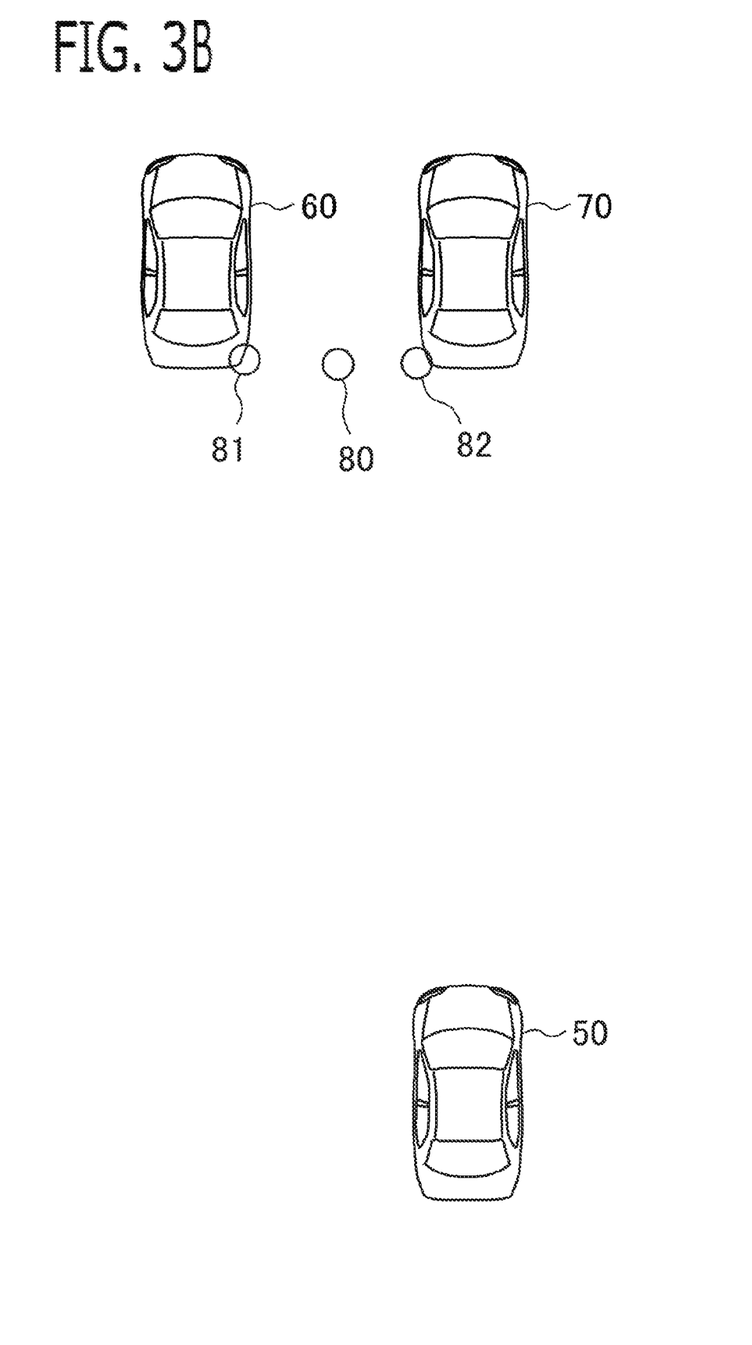

FIG. 3A and FIG. 3B are views for explaining an example of object detection by the object recognition apparatus according to Embodiment 1. In FIG. 3A and FIG. 3B, the object recognition apparatus 10 is mounted in an own vehicle 50. Other vehicle A 60 and other vehicle B 70 are vehicles traveling in front of the own vehicle 50. FIG. 3A is a view illustrating an example of a detection result 80 obtained through the first sensor 1; FIG. 3B is a view illustrating an example of the detection result 80, for other vehicle A 60 and other vehicle B 70, that is obtained through the first sensor 1 in the present period, and a detection result 81 for other vehicle A 60 and a detection result 82 for other vehicle B 70 in the immediately previous period.

FIG. 3A illustrates an example in which in a traveling scene where other vehicle A 60 and other vehicle B 70 are traveling side by side in a place far away from the own vehicle 50, the first sensor 1 cannot separate the other vehicles traveling side by side in the far place and hence outputs only the detection result 80 to the surrounding of the central position between the vehicles traveling side by side. FIG. 3B illustrates an example in which although in the immediately previous period, other vehicle A 60 and other vehicle B 70 traveling side by side in front of the own vehicle 50 could be separated into the detection result 81 and the detection result 82; only the detection result 80 is outputted in the present period, and other vehicle A 60 and other vehicle B 70 cannot be separated from each other.

Figure 2:
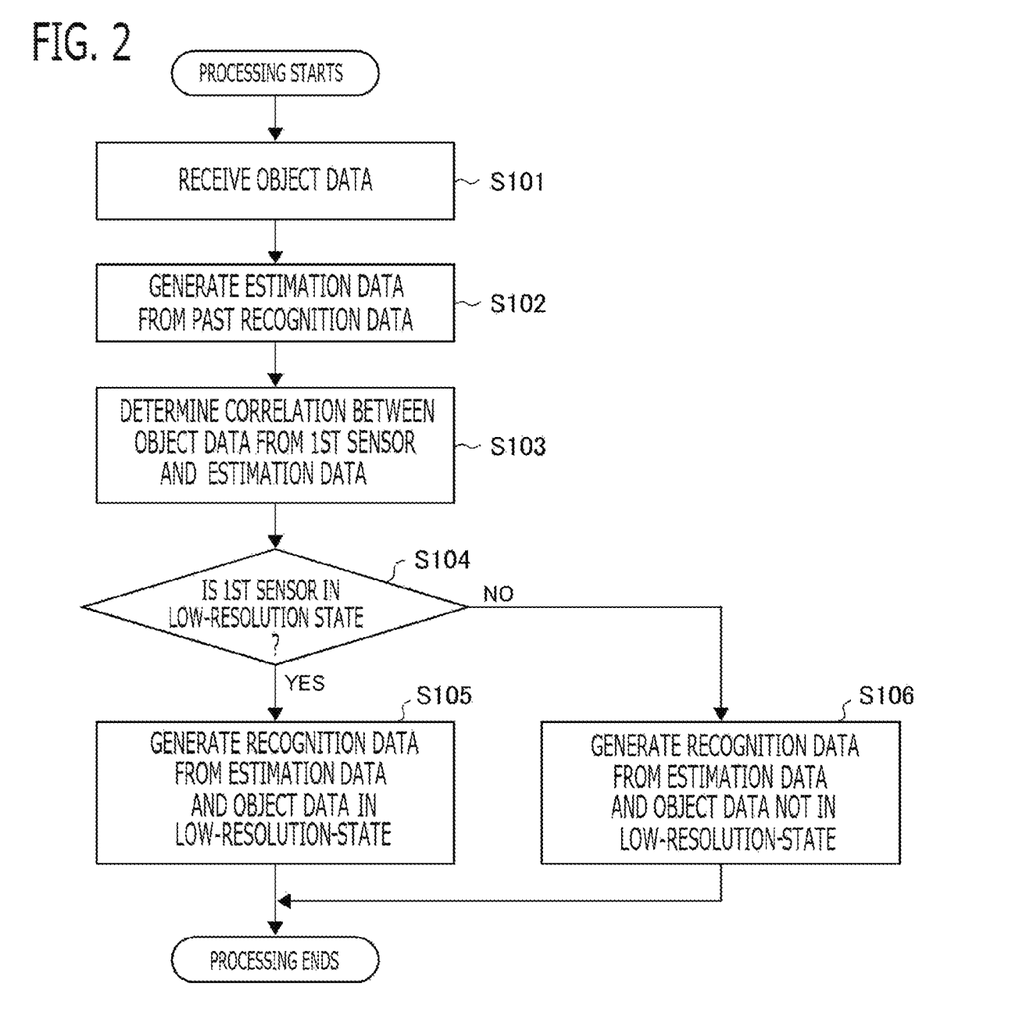
FIG. 2 is a flowchart representing the operation of the object recognition apparatus according to Embodiment 1.

Next, the operation will be explained. Next, the operation of the object recognition apparatus 10 according to Embodiment 1 will be explained by use of FIG. 2. The flowchart in FIG. 2 represents processing in one period; the processing is repeatedly implemented in a preliminarily determined processing period.

The step S101 (the first step) represents processing by the data reception unit 2. In the step S101, the data reception unit 2 receives the first object data from the first sensor 1.

The step S102 (the second step) represents processing by the estimation processing unit 3. In the step S102, by use of recognition data that is generated by the recognition processing unit 6 based on the first object data that has been received by the data reception unit 2 in a past period prior (e.g., one period prior) with respect to a specific period, the estimation processing unit 3 estimates an object state value in the specific period (e.g., in the present period). In other words, the estimation processing unit 3 estimates an object state value from the past recognition data and then generates the estimated state value, as estimation data. In addition, the estimation processing unit 3 outputs the generated estimation data to the correlation processing unit 4, the low-resolution-state determination unit 5, and the recognition processing unit 6.

The step S103 (the fifth step) represents one of processing items performed by the correlation processing unit 4. In the step 104, the correlation processing unit 4 calculates one-to-one correlation between the estimation data generated by the estimation processing unit 3 in the step S102 and the first object data from the first sensor 1, and then determines the correlation.

The step S104 (the third step) represents one of processing items performed by the low-resolution-state determination unit 5. In the step S104, the low-resolution-state determination unit 5 determines whether or not the first object data from the first sensor 1 is in the low-resolution state. In the case where in the step S103, there exists estimation data having no correlation, the low-resolution-state determination unit 5 in the step S104 again calculates one-to-one correlation between the estimation data having no correlation and the first object data. In this situation, in the case where the first object data that has one-to-one correlation with the estimation data having no correlation overlaps with the first object data that has been determined to have one-to-one correlation with the estimation data, the low-resolution-state determination unit 5 determines that this first object data is in the low-resolution state (the example in FIG. 3B).

As other determination methods, for example, there exist the following two methods. (1) As other method, the low-resolution-state determination unit 5 in the step S104 compares the number of first object data items in a preliminarily determined range with the number of estimation data items generated in a range corresponding to this determined range. In the case where the number of first object data items is smaller than the number of estimation data items, the low-resolution-state determination unit 5 determines that the first object data is in the low-resolution state.

(2) As other method, in the case where the longitudinal distance related to the first object data detected by the first sensor 1 is longer than a preliminarily determined distance and when the respective transverse distances between two or more estimation data items are compared with one other, each of the relative distances is shorter than the resolution of the first sensor 1, the low-resolution-state determination unit 5 in the step S104 may determine that the first object data is in the low-resolution state.

In the case where through foregoing other method (1) or (2), it is determined that the first object data is in the low-resolution state, the low-resolution-state determination unit 5 in the step S104 relates the first object data that has been determined to be in the low-resolution state to the estimation data and then determines the correlation. In the step S104, in the case where the first object data from the first sensor 1 is not in the low-resolution state, the step S104 is followed by the step S106.

In the step S106 (the fourth step), from the estimation data and the first object data that is not in the low-resolution state, the recognition processing unit 6 generates and outputs recognition data. Specifically, the recognition processing unit 6 weighted-averages the first object data of the first sensor 1 and the estimation data, using preliminarily determined weights, and generates a weighted averaging value as the recognition data. In this explanation, weighted-averaging has been described as an example; however, it may be allowed to utilize a method in which an object state value is created by use of a Kalman filter or the like in such a way that the same effect can be obtained.

In the step S104, in the case where the first object data from the first sensor 1 is in the low-resolution state, the step S104 is followed by the step S105.

In the step S105 (the fourth step), because the first object data, which is the result of detection by the first sensor 1, is in the low-resolution state, the recognition processing unit 6 changes weighting value in the weighted-averaging of the first object data so that the reflection degree of the first object to the recognition data is lowered. For example, in the case where the transverse position accuracy of the first sensor 1 is low, the weighted-averaging is performed after decreasing the weighting value of transverse position for the first object data, which is the result of detection by the first sensor 1. Alternatively, by performing the weighted-averaging after setting the weighting value of transverse position for the first object data, which is the result of detection by the first sensor 1, to "0", the recognition data is generated; then, the processing is ended. In this explanation, weighted-averaging has been described as an example; however, it may be allowed to utilize a method in which an object state value is created by use of a Kalman filter or the like in such a way that the same effect can be obtained. In addition, also in the case where the accuracy of other state value in the object data from the first sensor 1 is low, the weighting value of this other state value for the first object data may be decreased so as to lower the reflection degree.

In Embodiment 1, the weighting value in weighted-averaging of object data that is in the low-resolution state is decreased, i.e., the reflection degree of this object data to the recognition data is lowered, and then recognition is performed; thus, it is made possible to further raise the recognition accuracy for objects in the surrounding of the own vehicle in comparison with conventional apparatuses.

Embodiment 2

Embodiment 2 is an example in which the number of sensor information items to be inputted to an object recognition apparatus is two or more; as a representative example, the case where the number of sensors is two will be explained.

Figure 4:
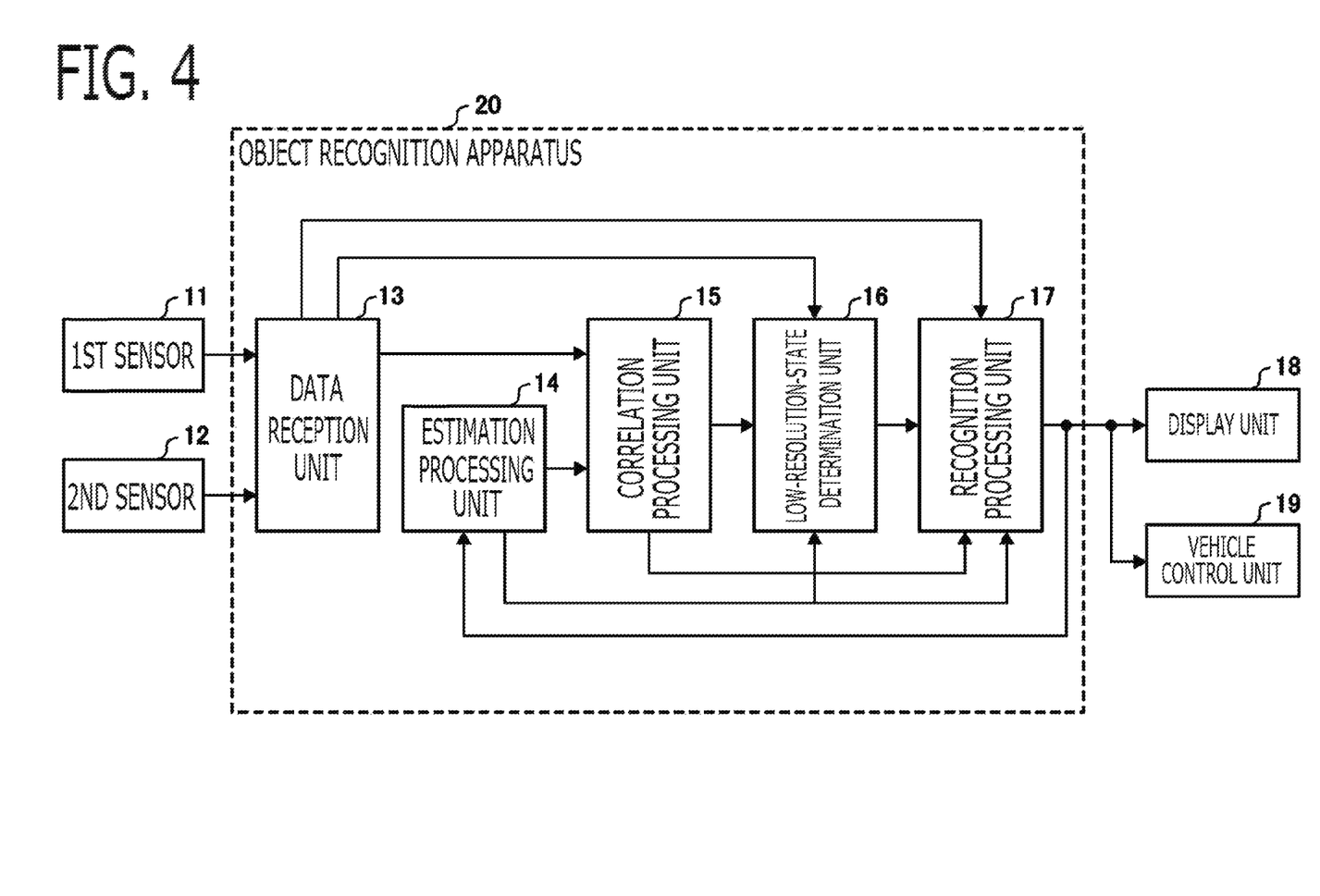
FIG. 4 is a block diagram representing the configuration of an object recognition apparatus according to Embodiment 2.

FIG. 4 is a block diagram representing the configuration of an object recognition apparatus according to Embodiment 2. In FIG. 4, the respective outputs of a first sensor 11 and a second sensor 12 are inputted to an object recognition apparatus 20. A vehicle control apparatus has a display unit 18 or a vehicle control unit 19 in addition to the object recognition apparatus 20.

The first sensor 11 and the second sensor 12 are provided in the front portion, the side portion, or the rear portion of the body of the own vehicle. Each of the first sensor 11 and the second sensor 12 detects, as object data, one or more detection data items related to an object existing in the surrounding of the own vehicle in a predetermined detection range. Then, each of the first sensor 11 and the second sensor 12 transmits the object data to a data reception unit 13 of the object recognition apparatus 20.

The object data includes, for example, information items such as the longitudinal relative distance between the own vehicle and the object, the transverse relative distance between the own vehicle and the object, the relative speed of the object, and the relative acceleration of the object. In general, in the case where a single object exists in a detection range where each of the first sensor 11 and the second sensor 12 can perform detection, the object data includes a single detection data item; in the case where two or more objects exist in the detection range, the object data includes two or more detection data items. Hereinafter, the explanation will be made while referring to object data detected by the first sensor 11 in Embodiment 2 as a first object data and referring to object data detected by the second sensor 12 as a second object data.

The first sensor 11 and the second sensor 12 receive a detection wave such as light or an electromagnetic wave emitted from an object and apply processing such as signal processing or image processing to the received detection wave, so that the state value of the object is detected as the first object data and the second object data.

As each of the first sensor 11 and the second sensor 12, for example, a millimeter wave radar, a laser radar, an ultrasonic sensor, an infrared sensor, an optical camera, or the like is utilized. In Embodiment 2, there will be explained, as an example, the case where as the first sensor 11, a millimeter wave radar is utilized; and as the second sensor 12, an optical camera is utilized.

One of the characteristic operation processing items is to estimate and generate an object state value from the first object data and the second object data detected by the first sensor 11 and the second sensor 12, respectively.

The object recognition apparatus 20 is realized, for example, through processing by a CPU or the like that runs a program stored in a memory.

The object recognition apparatus 20 is configured in such a manner as described below. The data reception unit 13 receives the first object data from the first sensor 11 and the second object data from the second sensor 12. An estimation processing unit 14 estimates an object state value from after-mentioned past recognition data and then generates the estimated state value, as estimation data. The estimation processing unit 14 outputs the generated estimation data to a correlation processing unit 15.

The correlation processing unit 15 receives the first object data and the second object data outputted from the data reception unit 13 and the estimation data outputted by the estimation processing unit 14, determines the correlation between the first object data (the object state value) and the estimation data, and the correlation between the second object data and the estimation data, and then outputs the determined correlations, as correlation data items. As the method of determining the correlation, Euclidean distances, Mahalanobis distances, or the like are utilized and, for example, in the case where the first object data and the estimation data are in a correlation that the distance therebetween is shorter than a threshold value and is shortest, the respective data items are defined as correlation data items that are in correlation. There may be utilized a method in which when in addition to the foregoing distance information, the respective types or the like of the first object data and the estimation data are the same, it is determined that a correlation exists.

Based on a comparison between the first object data outputted from the data reception unit 13 and the estimation data outputted from the estimation processing unit 14, a low-resolution-state determination unit 16 determines whether or not the first object data is in the low-resolution state.

Based on the first object data, the second object data, the estimation data outputted from the estimation processing unit 14, the correlation data outputted from the correlation processing unit 15 that determines the correlation, and the result of determination on whether or not the first object data is in the low-resolution state by the low-resolution-state determination unit 16, a recognition processing unit 17 generates an object state value, as recognition data. In addition, the recognition processing unit 17 outputs the recognition data to the estimation processing unit 14, the display unit 18, and the vehicle control unit 19.

There will be described an example in which new recognition data is generated from object data, recognition data in the immediately previous period, and the correlation of estimation data. For example, it is assumed that because the recognition data in the immediately previous period recognizes two vehicles in front of the own vehicle and the object data in the present period recognizes a single preceding vehicle, it is determined that the object data is in the low-resolution state. On that occasion, the inter-vehicle distance between the two vehicles in the recognition data in the immediately previous period is calculated. Next, when it is assumed that the object data in the present period is detected at the center of a straight line connecting two other vehicles in front of the own vehicle and the inter-vehicle distance in the recognition data in the immediately previous period is maintained, it is made possible that virtual points are set at the both side positions, of a single object data item in the present period, that are spaced apart from each other by half of the inter-vehicle distance in the recognition data in the immediately previous period, and new recognition data is generated at the center between each of the virtual points and the estimation data. It may be allowed that based on the proportion of reflection intensities in the recognition data in the immediately previous period, it is assumed that the object data in the present period is detected not at the center of a straight line connecting two other vehicles in front of the own vehicle but at a position offset toward an object having a higher reflection intensity and then new recognition data is generated. It may be allowed that as the inter-vehicle distance between two vehicles in front of the own vehicle, the average value of two or more past recognition data items is utilized.

As described above, by use of the past-period (e.g., one-period prior) recognition data outputted from the recognition processing unit 17, the estimation processing unit 14 estimates present-period first object data (an object state value) and then outputs the estimated state value, as the estimation data.

When receiving the recognition data, the display unit 18 displays the position, the speed, and the like of the object on a screen. When receiving the recognition data, the vehicle control unit 19 controls the travel of the own vehicle, based on the inputted recognition data. The control of the travel of the own vehicle includes, for example, control items such as acceleration/deceleration and steering of the own vehicle.

The apparatus including the object recognition apparatus 20 and the display unit 18 will be referred to as a first vehicle control apparatus. The apparatus including the object recognition apparatus 20 and the vehicle control unit 19 will be referred to as a second vehicle control apparatus.

The recognition processing unit 17 generates and outputs, as the recognition data, an object state value calculated by weighted-averaging the first object data (object state value), the second object data (object state value), and the estimation data, using preliminarily determined weights. In the recognition processing unit 17, there may be utilized a method in which by use of a Kalman filter or the like, the object state value is updated.

Figure 6:
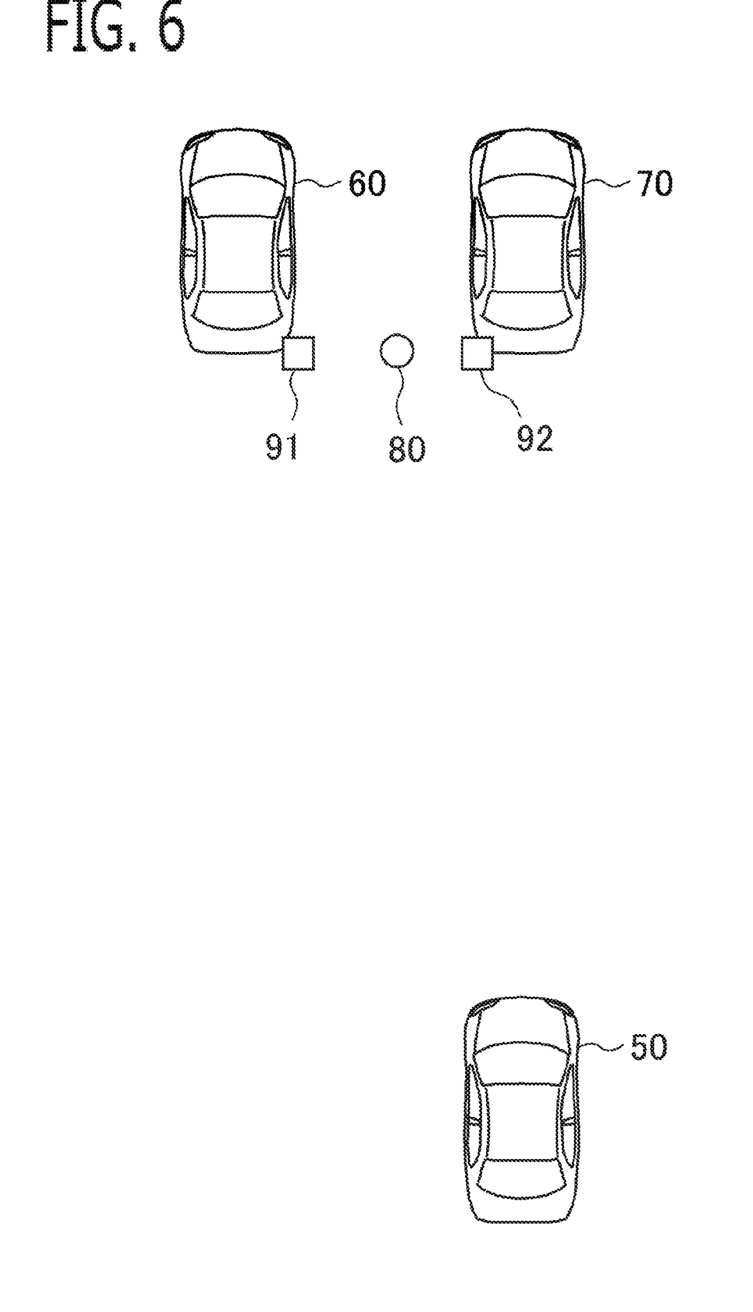
FIG. 6 is a view for explaining an example of object detection by the object recognition apparatus according to Embodiment 2.

FIG. 6 is a view for explaining an example of object detection by the object recognition apparatus according to Embodiment 2. In FIG. 6, in a traveling scene where other vehicle A 60 and other vehicle B 70 are traveling side by side in a place far away from the own vehicle 50, the first sensor 11 is a millimeter wave radar and the angular resolution (transverse resolution) thereof is low; therefore, in some cases, other vehicle A 60 and other vehicle B 70 that are traveling side by side in a place far away from the own vehicle 50 cannot be separated from each other and hence only the detection result 80 is outputted. In contrast, the second sensor 12 is an optical camera and the angular resolution (transverse resolution) thereof is higher than that of the first sensor 11; therefore, there seldom occurs the case where two or more other vehicles traveling side by side in a place far away from the own vehicle 50 cannot be separated from each other. In sum, the camera seldom outputs, as a single object data item, other vehicle A 60 and other vehicle B 70 that are traveling side by side in a place far away from the own vehicle; the camera outputs detection results 91 and 92 corresponding to other vehicle A 60 and other vehicle B 70.

Figure 5:
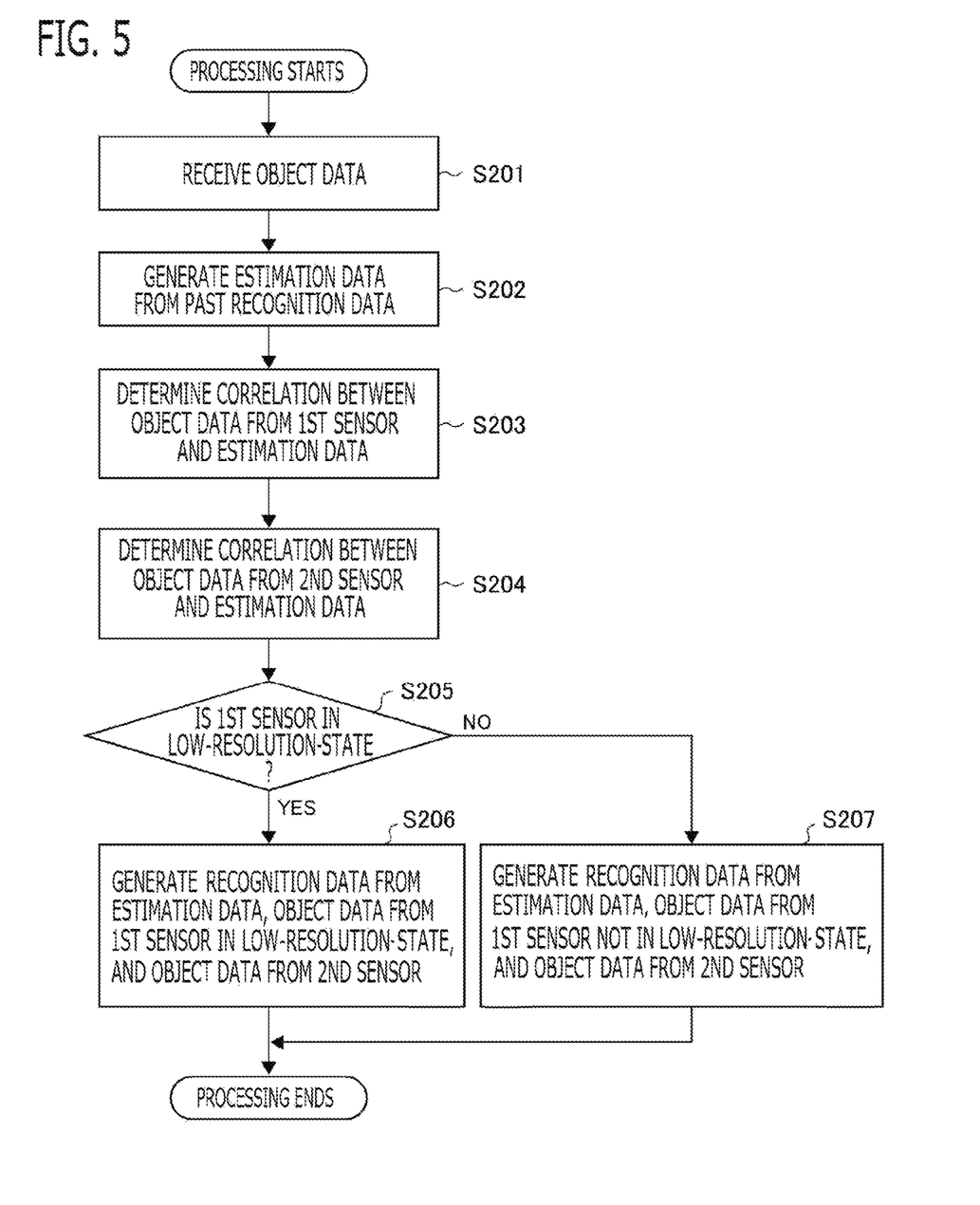
FIG. 5 is a flowchart representing the operation of the object recognition apparatus according to Embodiment 2.

Next, the operation will be explained. Hereinafter, the operation of the object recognition apparatus 20 according to Embodiment 2 will be explained by use of FIG. 5. The flowchart in FIG. 5 represents processing in one period; the processing is repeatedly implemented in a preliminarily determined processing period.

The step S201 (the first step) represents processing by the data reception unit 13. In the step S201, the data reception unit 13 receives the first object data from the first sensor 11 and the second object data from the second sensor 12.

The step S202 (the second step) represents processing by the estimation processing unit 14. In the step S202, by use of recognition data that is generated by the recognition processing unit 17 based on the first object data (object state value) and the second object data (object state value) that have been received by the data reception unit 13 in a past period prior (e.g., one period prior) with respect to a specific period, the estimation processing unit 14 estimates an object state value in the specific period. In other words, the estimation processing unit 14 estimates an object state value from the past recognition data and then generates the estimated state value, as estimation data. In addition, the estimation processing unit 14 outputs the generated estimation data to the correlation processing unit 15, the low-resolution-state determination unit 16, and the recognition processing unit 17.

The step S203 (the fifth step) represents one of processing items performed by the correlation processing unit 15. In the step 203, the correlation processing unit 15 calculates one-to-one correlation between the estimation data generated by the estimation processing unit 14 in the step S202 and the first object data from the first sensor 1 and then determines the correlation.

The step S204 (the fifth step) represents one of processing items performed by the correlation processing unit 15. In the step 204, the correlation processing unit 15 calculates one-to-one correlation between the estimation data generated by the estimation processing unit 14 in the step S202 and the second object data from the second sensor 12, and then determines the correlation.

Now, the correlation between the object data from the first sensor and the estimation data is determined in the step S203, and the correlation between the object data from the second sensor and the estimation data is determined in the step S204; thus, the correlation between the object data from the first sensor and the object data from the second sensor is determined.

The step S205 (the third step) represents one of processing items performed by the low-resolution-state determination unit 16. In the step S205, the low-resolution-state determination unit 16 determines whether or not the first object data (the same meaning as the object state value) from the first sensor 1 is in the low-resolution state.

In the case where in the step S203, there exists estimation data having no correlation, the low-resolution-state determination unit 16 in the step S205 again calculates one-to-one correlation between the estimation data having no correlation and the first object data. In this situation, in the case where the first object data that has one-to-one correlation with the estimation data having no correlation overlaps with the first object data that has been determined to have one-to-one correlation with the estimation data, the low-resolution-state determination unit 16 determines that this first object data is in the low-resolution state.

As other determination methods, for example, there exist the following two methods. (1) As other method, the low-resolution-state determination unit 16 in the step S205 compares the number of first object data items in a preliminarily determined range with the number of estimation data items generated in a range corresponding to the foregoing range. In the case where the number of first object data items is smaller than the number of estimation data items, the low-resolution-state determination unit 16 determines that the first object data is in the low-resolution state.

(2) As other method, in the case where the longitudinal distance related to the first object data detected by the first sensor 1 is longer than a preliminarily determined distance and when the respective transverse distances between two or more estimation data items are compared with one another, each of the relative distances is shorter than the resolution of the first sensor 1, the low-resolution-state determination unit 16 in the step S205 may determine that the first object data is in the low-resolution state.

In the case where through foregoing method (1) or (2), it is determined that the first object data is in the low-resolution state, the low-resolution-state determination unit 16 in the step S205 correlates the first object data that has been determined to be in the low-resolution state with the estimation data and then determines the correlation.

In the step S205, in the case where the first object data from the first sensor 11 is not in the low-resolution state, the step S205 is followed by the step S207.

The step S207 (the fourth step) represents processing by the recognition processing unit 17. In the step S207, from the estimation data, the first object data that is not in the low-resolution state, and the second object data, the recognition processing unit 17 generates and outputs recognition data. Specifically, the recognition processing unit 17 weighted-averages the first object data from the first sensor 11, the second object data from the second sensor 12, and the estimation data, using preliminarily determined weights, and generates an averaging value as the recognition data. In this situation, it may be allowed to utilize a method in which an object state value is created by use of a Kalman filter or the like in such a way that the same effect can be obtained.

In the step S205, in the case where the first object data from the first sensor 11 is in the low-resolution state (the example in FIG. 6), the step S205 is followed by the step S206.

In the step S206 (the fourth step), because the first object data, which is the result of detection by the first sensor 1, is in the low-resolution state, the recognition processing unit 17 changes weighting value in the weighted-averaging of the first object data so that the reflection degree of the first object data to the recognition data is lowered. For example, in the case where the transverse position accuracy of the first sensor 1 is low, the weighted-averaging is performed after decreasing the weighting value of transverse position for the first object data, which is the result of detection by the first sensor 11. In other words, in the case of weighted-averaging the first object data of the first sensor 11, the second object data from the second sensor 12, and the estimation data, using preliminarily determined weights, the recognition processing unit 17 performs the weighted-averaging after decreasing the weighting value of transverse position for the first object data and then generates the recognition data. Alternatively, by performing the weighted-averaging after setting the weighting value of transverse position for the first object data, which is the result of detection by the first sensor 1, to "0", the recognition data is generated and outputted; then, the processing is ended.

In this explanation, weighted-averaging has been described as an example; however, it may be allowed to utilize a method in which by use of a Kalman filter or the like for increasing transverse position observation noise of the first sensor 11, an object state value is created in such a way that the same effect can be obtained.

Embodiment 2 makes it possible that even when there exist inputs from two or more sensors, the recognition accuracy for objects in the surrounding of the own vehicle is further raised in comparison with conventional apparatuses. In the foregoing embodiment, there has been described the case where the transverse position accuracy of the first object data is low; however, also in the case where the accuracy of other state value in the first object data is low, it is only necessary to decrease the weighting value for this state value in the first object data so as to lower the reflection degree.

Figure 7:
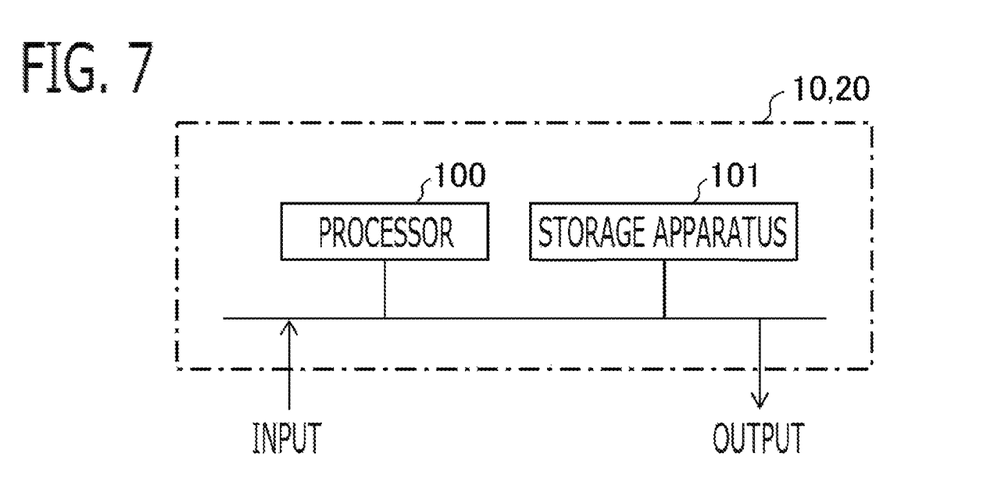
FIG. 7 is a block diagram representing the hardware configuration of each of the object recognition apparatuses according to Embodiments 1 and 2.

As an example of hardware is illustrated in FIG. 7, each of the object recognition apparatuses 10 and 20 includes a processor 100 and a storage apparatus 101. Although not illustrated, the storage apparatus is provided with a volatile storage device such as a random access memory and a nonvolatile auxiliary storage device such as a flash memory. Instead of a flash memory, the storage apparatus may be provided with a hard-disk auxiliary storage device. The processor 100 runs a program inputted from the storage apparatus 101. In this case, the program is inputted from the auxiliary storage device to the processor 100 by way of the volatile storage device. The processor 100 may output data such as a calculation result to the volatile storage device in the storage apparatus 101 or may store the data in the auxiliary storage device by way of the volatile storage device.

Although the present disclosure is described above in terms of various exemplary embodiments and implementations, it should be understood that the various features, aspects and functions described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the technology disclosed in the specification of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. An object recognition apparatus comprising:

an estimation processor that in response to an object being detected by a sensor for detecting surrounding objects, estimates a change in a state value of the object, based on past recognition data detected by the sensor and calculated in the past, and then generates estimation result as estimation data;

a low-resolution-state determination processor that compares the estimation data estimated by the estimation processor with object data that is a state value of the object obtained by the sensor at a current time, so as to determine whether or not the object data is data in a low-resolution state where two or more objects cannot be separated from one another;

a recognition processor that generates recognition data by combining the estimation data and the object data, and a correlation processor that determines whether or not there exists correlation that the estimation data and the object data are related to the same object, and generates determination result as correlation data, wherein in a case where the low-resolution-state determination processor determines that the object data obtained at the current time is in the low-resolution state, the recognition processor reduces a weight to the recognition data in combining the object data that was determined to be in the low-resolution state, and then generates the recognition data, wherein based on the correlation data generated by the correlation processor, the low-resolution-state determination processor determines whether or not the object data is data in the low-resolution state, and wherein in the case where there exists the estimation data having no correlation with the object data, the correlation processor again determines whether or not the estimation data having no correlation has correlation with the object data; in the case where the object data that has been determined to have correlation with the estimation data is determined to have correlation with the estimation data having no correlation with the object data, the low-resolution-state determination processor determines that the object data is data in the low-resolution state.

2. The object recognition apparatus according to claim 1, wherein the recognition processor applies the weight to the object data and the estimation data so as to calculate the state value of the object, and wherein in the case where it is determined that the object data is in the low-resolution state, the recognition processor decreases the weight for the object data and then calculates the state value of the object.

3. A vehicle control apparatus having the object recognition apparatus according to claim 1, wherein the object recognition apparatus is mounted in a vehicle.

4. The vehicle control apparatus according to claim 3, wherein there is provided a display that is mounted in the vehicle and displays recognition data outputted by the recognition processor.

5. The vehicle control apparatus according to claim 3, wherein there is provided a vehicle controller that is mounted in the vehicle and controls the vehicle, based on recognition data to be outputted by the recognition processor.

6. An object recognition method comprising:

receiving, from a sensor for detecting a surrounding object, object data that is a state value of the object;

estimating a change in the state value of the object, based on past recognition data detected by the sensor and calculated in the past, and then generating estimation result as estimation data;

comparing the estimation data with the object data obtained by the sensor at a current time, so as to determine whether or not the object data is data in a low-resolution state where the two or more objects cannot be separated from one another;

generating recognition data by combining the estimation data and the object data, and determining whether or not there exists correlation that the estimation data and the object data are related to the same object, and generating determination result as correlation data, wherein in generating the recognition data, in a case where it is determined that the object data is in the low-resolution state, reducing a weight to the recognition data in combining the object data that was determined to be in the low-resolution state and then generating the recognition data, and wherein in comparing the estimation data, based on the correlation data, determining whether or not the object data is data in the low-resolution state.

7. A vehicle control method comprising:

the object recognition method, according to claim 6, that is utilized in recognizing the object in the surrounding of a vehicle; and displaying the recognition data outputted by the object recognition method on a display.

8. A vehicle control method comprising:

the object recognition method, according to claim 6, that is utilized in recognizing the object in the surrounding of a vehicle; and controlling the vehicle by use of the recognition data outputted by the object recognition method.

* * * * *